(12) United States Patent
Kim et al.

(10) Patent No.: US 10,412,751 B2
(45) Date of Patent: Sep. 10, 2019

(54) SCHEDULING METHOD AND APPARATUS

(71) Applicants: SEOUL NATIONAL UNIVERSITY R&DB FOUNDATION, Seoul (KR); INDUSTRIAL COOPERATION FOUNDATION CHONBUK NATIONAL UNIVERSITY, Jeonju-si (KR)

(72) Inventors: Seo Hyang Kim, Seoul (KR); Duc Lam Nguyen, Seoul (KR); Naeon Kim, Seoul (KR); Chong Kwon Kim, Seoul (KR); Gihwan Cho, Jeonju-si (KR)

(73) Assignees: SEOUL NATIONAL UNIVERSITY R&DB FOUNDATION, Seoul (KR); INDUSTRIAL COOPERATION FOUNDATION CHONBUK NATIONAL UNIVERSITY, Jeonju-si (KR)

( * ) Notice: Subject to any disclaimer, the term of this patent is extended or adjusted under 35 U.S.C. 154(b) by 34 days.

(21) Appl. No.: 15/587,348

(22) Filed: May 4, 2017

(65) Prior Publication Data

US 2018/0288782 A1  Oct. 4, 2018

(30) Foreign Application Priority Data

Mar. 30, 2017 (KR) .......................... 10-2017-0041121

(51) Int. Cl.
*H04W 40/24* (2009.01)
*H04W 72/12* (2009.01)

(52) U.S. Cl.
CPC ....... *H04W 72/121* (2013.01); *H04W 40/244* (2013.01); *H04W 72/1257* (2013.01)

(58) Field of Classification Search
CPC .......... H04W 72/121; H04W 72/1289; H04W 40/244; H04W 72/0446
See application file for complete search history.

(56) References Cited

U.S. PATENT DOCUMENTS

2010/0260164 A1* 10/2010 Moon ................... H04L 5/0007
370/345
2012/0155260 A1* 6/2012 Vasseur ................. H04L 47/125
370/230.1

(Continued)

OTHER PUBLICATIONS

Simon Duquennoy, Beshr Al Nahas, Olaf Landsiedel, and Thomas Watteyne, Orchestra: Robust Mesh Networks Through Autonomously Scheduled TSCH, Proceedings of the 13th ACM Conference on Embedded Networked Sensor Systems, Nov. 4, 2015, pp. 337-350, Seoul, South Korea.

(Continued)

*Primary Examiner* — Andrew Lai
*Assistant Examiner* — Chuong M Nguyen
(74) *Attorney, Agent, or Firm* — KORUS Patent, LLC; Seong Il Jeong

(57) ABSTRACT

Disclosed herein are a scheduling apparatus and method. The scheduling apparatus includes a network topology configuration unit and a scheduling unit. The network topology configuration unit configures a network topology that connects nodes to which rank values have been allocated based on a sink node. The scheduling unit schedules data transmission over an uplink and a downlink in a first region and a second region defined in each slot frame based on the rank values obtained based on the sink node. The first region and the second region have different time offsets within the slot frame.

14 Claims, 8 Drawing Sheets

(56) References Cited

U.S. PATENT DOCUMENTS

| | | | |
|---|---|---|---|
| 2015/0156738 A1* | 6/2015 | Guo | H04W 56/002 709/236 |
| 2016/0066319 A1* | 3/2016 | Sakata | H04B 7/2121 370/336 |
| 2016/0174192 A1* | 6/2016 | Raghu | H04W 72/1289 370/329 |
| 2018/0124812 A1* | 5/2018 | Thubert | H04W 72/1263 |
| 2018/0146489 A1* | 5/2018 | Jin | H04B 7/022 |

OTHER PUBLICATIONS

Watteyne, et al., Using IEEE802.15.4e TSCH in an IoT context: Overview, Problem Statement and Goals draft-etf-6tisch-tsch-06, Linear Technology, Internet-Draft, Sep. 10, 2015, https://tools.ietf.org/html/draft-ieff-6tisch-tsch-06.

* cited by examiner

SCHEDULING METHOD AND APPARATUS

BACKGROUND

1. Technical Field

The present invention relates generally to a scheduling apparatus and method, and more particularly to a scheduling apparatus and method that can minimize negotiations between nodes within a network.

The present invention has been derived from research conducted for Project for Research into Resilient/Fault-Tolerant Autonomous Networking Technology based on the Physical Attributes, Relationships and Roles of IoT Devices sponsored by the Korean Ministry of Science, ITC and Future Planning and the Institute for Information & Communications Technology Promotion [Project Management Number: No. B0190-16-2017] and Project for the Promotion of University ICT Research Centers sponsored by the Korean Ministry of Science, ITC and Future Planning and the Institute for Information & Communications Technology Promotion [Project Management Number: IITP-2017-R0992-17-1023] in 2016, and National Research Foundation of Korea (NRF) Grant funded by the Korean Government (MSIP) (No. 2016R1A5A1012966).

2. Description of the Related Art

Recently, interest in a ubiquitous computing environment in which all things are equipped with computing, sensing, and communication functions has increased. A ubiquitous computing environment has attracted attention as the core technology of sensor network technology that performs the functions of detecting and controlling environments outside humans.

A wireless sensor network based on such a ubiquitous computing environment, e.g., ZigBee, is wireless communication technology developed for wireless application services for civil and industrial fields requiring low power, low cost and small amounts of data. ZigBee defines network, security and application layers, i.e., higher-level layers, based on the IEEE 802.15.4 standard that defines a physical layer and a medium access control (MAC) layer, i.e., layers lower than the network layer.

Recently, such a wireless sensor network has been applied to Internet of Things (IoT) communication, and has been used for communication between a plurality of nodes. Nodes for the construction of a wireless sensor network may implement a network by using a centralized method or a distributed method.

For example, when a network is implemented using the centralized method, a single representative node controls the scheduling operations of all nodes present in the same network. When a single node controls overall communication within a network as described above, the corresponding node requires large amounts of information. Accordingly, in the network constructed using the centralized method, when there is a rapid change in a network topology, the transfer of large amounts of data from all nodes to a representative node is required for scheduling, and thus it is impossible to deal with this situation. Furthermore, disadvantages also arise in that all the nodes require additional energy and bandwidth resources attributable to the transfer of the data to the representative node and a long period of time is required for the initialization of the network.

Furthermore, when a network is implemented using the distributed method, all nodes themselves perform scheduling operations. In this case, each of the nodes must communicate with adjacent nodes in order to avoid a collision that occurs when interfering nodes use the same channel at the same time. This network requires a specific negotiation protocol. In the case where a network is constructed using the centralized method, all information is collected at a central node and scheduling is determined, whereas in the case where a network is constructed using the distributed method, all the nodes within the network collect small amounts of information from adjacent nodes and perform scheduling via a separate negotiation protocol. As a result, the network implemented using the distributed method is more robust to a rapid change in a network topology than the network implemented using the centralized method. However, each of the nodes must submit to additional traffic during the process of negotiation with adjacent nodes, and thus consumes additional energy and network resources. Furthermore, from the point of view of the overall network, the network implemented using the distributed method has the disadvantage of lacking visibility because scheduling cannot be performed based on the overall network.

In order to overcome these disadvantages, there has been a need for a network which can minimize negotiations between nodes on a wireless sensor network and which can also minimize collisions attributable to data transmission between nodes.

Accordingly, there is a need for a technology for overcoming the above-described problems.

Meanwhile, the above-described background technology corresponds to technical information that has been possessed by the present inventor in order to contrive the present invention or that has been acquired in the process of contriving the present invention, and cannot be necessarily viewed as a well-known technology that had been known to the public before the filing of the present invention.

SUMMARY

An object of embodiments disclosed herein is to propose a scheduling apparatus and method that can minimize negotiations between nodes within a network.

An object of embodiments disclosed herein is to propose a scheduling apparatus and method that can minimize collisions attributable to data transmission between nodes within a network.

According to an aspect of the present invention, there is provided a scheduling apparatus, including: a network topology configuration unit configured to configure a network topology that connects nodes to which rank values have been allocated based on a sink node; and a scheduling unit configured to schedule data transmission over an uplink and a downlink in a first region and a second region defined in each slot frame based on the rank values obtained based on the sink node; wherein the first region and the second region have different time offsets within the slot frame.

According to another aspect of the present invention, there is provided a scheduling method for a scheduling apparatus, the scheduling method including: configuring a network topology that connects nodes to which rank values have been allocated based on a sink node; and scheduling data transmission over an uplink and a downlink in a first region and a second region defined in each slot frame based on the rank values obtained based on the sink node; wherein the first region and the second region have different time offsets within the slot frame.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
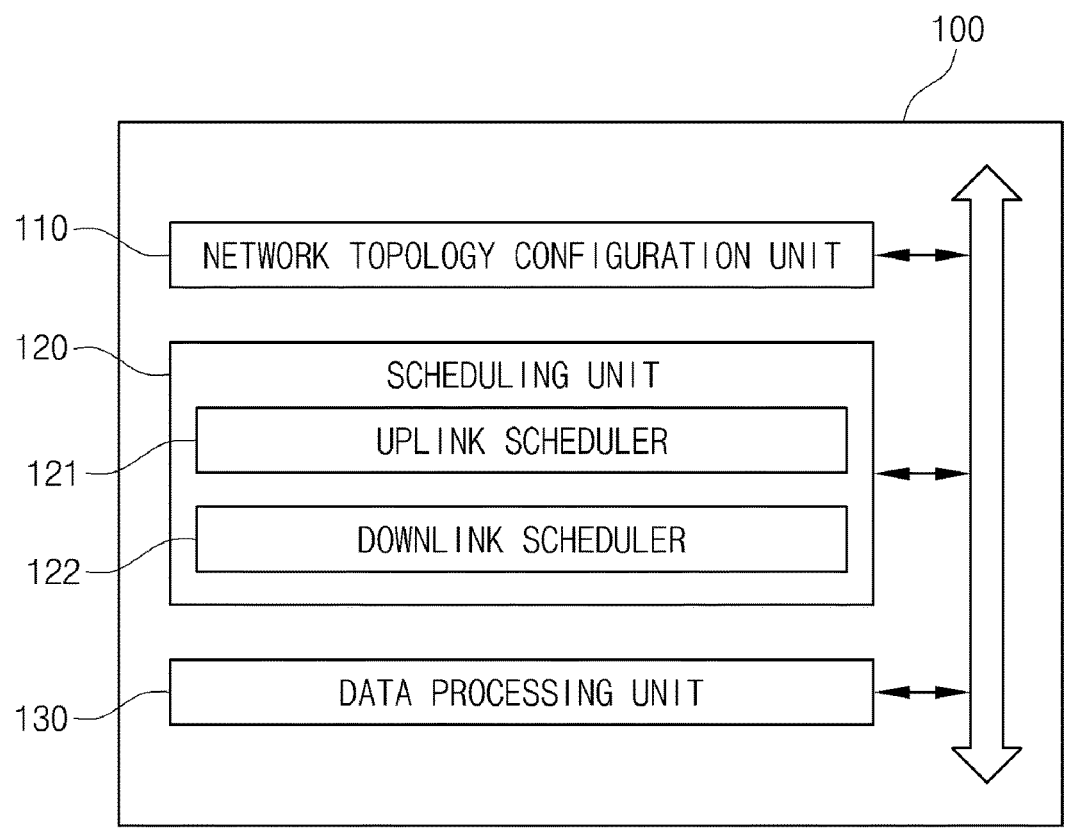
FIG. 1 is a block diagram showing a scheduling apparatus according to an embodiment of the present invention.

Various embodiments of the present invention will be described in detail below with reference to the accompanying drawings. The embodiments that will be described below may be practiced in various different modified forms. In order to more clearly describe the features of the embodiments, detailed descriptions of components and functions that are well known to those having ordinary knowledge in the art to which the following embodiments pertain will be omitted. Furthermore, in the drawings, the illustration of portions unrelated to the embodiments will be omitted. Throughout the specification, similar reference symbols will be assigned to similar components.

Throughout the specification and the claims, when one component is described as being "connected" or "coupled" to another component, the one component may be "directly connected" or "directly coupled" to the other component, or may be "connected" or "coupled" to the other component via a third component. Furthermore, when one component is described as "comprising" or "including" another component, the one component may not exclude a third component but may include a third component unless otherwise described.

Embodiments of the present invention will be described in detail below with reference to the accompanying drawings.

Prior to the following description, terms that will be used below are defined first.

In the following description, the term "node" refers to an object which has a communication function on a network and which may be connected to other nodes and communicate data. For example, in a sensor network, a node may be each sensor. Furthermore, one of all nodes on a network, which is a node based on which a network topology is configured, is referred to as a sink node. The sink node may be a reference node that is placed at the highest location of the network topology.

Terms requiring descriptions, other than the terms defined above, will be described separately in the following description.

FIG. 1 is a block diagram showing a scheduling apparatus 100 according to an embodiment of the present invention.

As shown in FIG. 1, the scheduling apparatus 100 may include a network topology configuration unit 110, a scheduling unit 120, and a data processing unit 130. For example, the scheduling apparatus 100 may be implemented in each of all nodes included in a network, or may be implemented via a plurality of nodes included in a network.

The network topology configuration unit 110 may configure a network topology by connecting all the nodes within the network based on a sink node.

For example, the network topology configuration unit 110 may use the IPv6 routing protocol for low-power lossy networks (hereinafter referred to as "RPL") in a network layer in order to configure network topology. As described above, when the network topology configuration unit 110 uses the RPL protocol, data transmission for separate negotiations between all the nodes within the network is not required. In this case, the network topology configuration unit 110 may transmit and receive a Destination Oriented Directed Acyclic Graph (DODAG) Information Object (hereafter referred to as the "DIO"), a DODAG Information Solicitation (hereafter referred to as the "DIS"), and a DODAG Advertisement Object (hereafter referred to as the "DAO") between the nodes. In this case, the DIO is a message that is adapted to generate and maintain an upward route. The DIS is a message that is transmitted to receive Destination Oriented Directed Acyclic Graph (DODAG) Information Objects (hereafter referred to as the "DIOs") from adjacent nodes. The DAO is a message that is adapted to maintain a downward route.

This enables the network topology configuration unit 110 to be allocated a hop count-based rank by a sink node. In this case, the rank is link quality between nodes, and refers to a hop count from the sink node or an expected transmission count. When the network topology configuration unit 110 connects to an RPL tree network, it can find the media access control (MAC) addresses of its own parent node and child nodes.

Therefore, the network topology configuration unit 110 can find the rank value of a corresponding node. Assuming that the rank is a hop count, a reference node implemented by the network topology configuration unit 110 may identify a node, having a rank value smaller than that of the reference node by 1, as a parent node, and may identify a node, having a rank value larger than that of the reference node by 1, as a child node.

Furthermore, the network topology configuration unit 110 may use RPL (routing protocol for low-power lossy networks) as a network layer protocol, and may use time slotted cell scheduling (hereinafter referred to as "TSCH")-based 802.15.4e as a link layer protocol.

The sink node periodically transmits a beacon signal (for example, a TSCH enhanced beacon). When each of the nodes, other than the sink node, receives a beacon signal, the node may be connected to a TSCH network formed by the sink node.

Meanwhile, in TSCH, an absolute slot number (hereinafter referred to as the "ASN") is used. The ASN refers to a value which is set to 0 when the sink node forms its own network and which is increased by 1 for each time slot. Accordingly, the scheduling unit 120 may find the sequential position of a period corresponding to a current slot frame by using the ASN and the length of the slot frame.

The scheduling unit 120 schedules data transmission and reception over an uplink and a downlink in the tree topology that connects nodes to which rank values have been allocated based on the sink node. In this case, the scheduling unit 120 may classify nodes as a node having an odd rank value or a node having an even rank value. Through this, the scheduling unit 120 may perform scheduling so that data may be transmitted and received over the links of nodes having odd and even rank values in each of regions having different time intervals in the slot frame.

In this case, the scheduling unit 120 may include an uplink scheduler 121 configured to schedule an uplink data and a downlink scheduler 122 configured to schedule downlink data.

The uplink scheduler 121 performs uplink scheduling adapted to transmit data in the direction of the sink node (for example, to transmit data to the parent node). For example, in a sensor network, a general node generates data including sensing information at intervals of a predetermined period, and transmits the data to a sink node. Accordingly, the uplink scheduler 121 may transmit data, including sensing information generated at a current node and sensing information received via a child node, to the parent node or sink node with the sink node set as a final destination.

The downlink scheduler 122 performs downlink scheduling adapted to transmit data in the direction opposite to the sink node (for example, to transmit data to a child node). Accordingly, the downlink scheduler 122 may receive a data packet received from the parent node, and may receive the packet itself when the destination of the packet is its own node and transmit the data in the direction of a child node when the destination of the packet is the child node.

Meanwhile, when the scheduling unit 120 is implemented in the sink node, the uplink scheduler 121 may transmit received data to a related server or the like in the network topology implemented in a tree form based on the sink node, and the downlink scheduler 122 may transmit data, received from the server or the like, to a corresponding node that is connected to the network topology implemented in a tree form.

The data processing unit 130 may provide data generated at the current node or data received from another node to the scheduling unit 120 so that the scheduling unit 120 can schedule the data. The data processing unit 130 may identify the destination node of the received data, and may provide information for data transmission to the scheduling unit 120 so that the data can be transmitted to the destination node. Furthermore, when the processing of data is required, the data processing unit 130 may process the corresponding data, and may store data generated during the data processing, data waiting for transmission, or the like. For this purpose, the data processing unit 130 may contain memory, or may use memory present outside the data processing unit 130.

The data processing unit 130 may transmit or receive data or may reduce energy in a sleep mode, according to a schedule made by the scheduling unit 120. For example, when the corresponding node is scheduled to perform message transmission and reception in a specific time slot, the data processing unit 130 may switch the corresponding node to an active state and may transmit or receive a message. In contrast, when the corresponding node is not scheduled to perform message transmission and reception in the specific time slot, the data processing unit 130 may switch the corresponding node to a sleep mode state, thereby reducing power.

The scheduling apparatus 100 according to an embodiment uses the RPL protocol and the TSCH-based 802.15. 4e protocol in the implementation of a network topology. Accordingly, the scheduling apparatus 100 does not require message transmission for separate negotiations between nodes, and thus may minimize data transmission between the nodes. Furthermore, the scheduling apparatus 100 schedules the transmission and reception points of data based on links between nodes based on the slot frame, and transmits data with a transmission region defined within the slot frame based on rank values, thereby minimizing collisions attributable to data transmission between the nodes.

Figure 2:
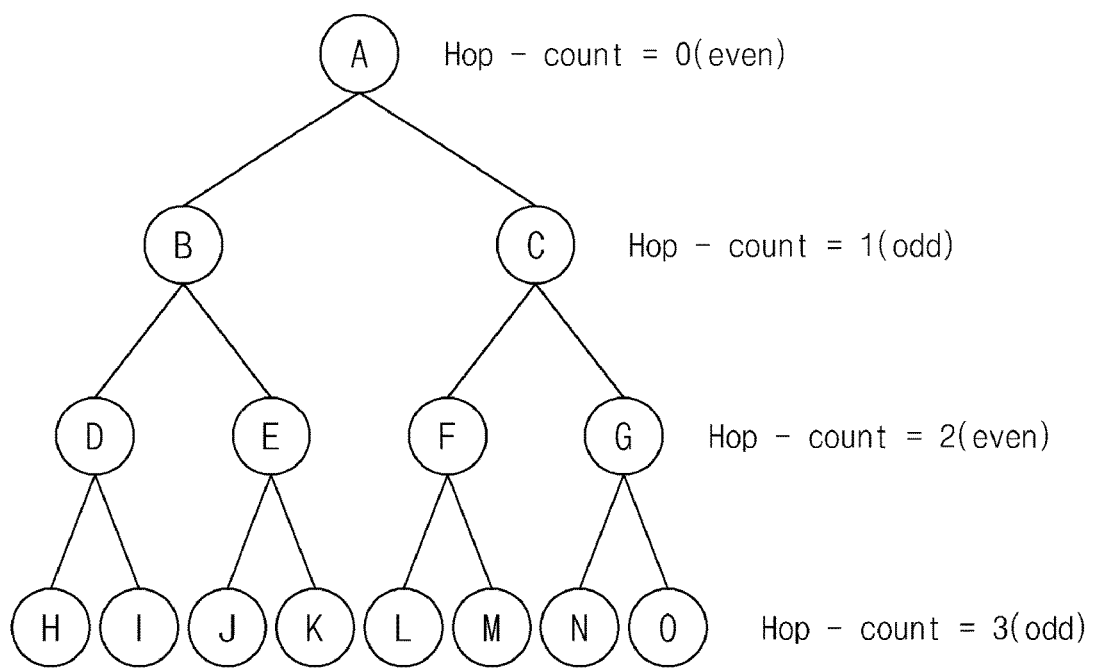
FIG. 2 is a diagram showing a network topology according to an embodiment of the present invention.

FIG. 2 is a diagram showing a network topology according to an embodiment of the present invention.

As shown in FIG. 2, the scheduling apparatus 100 implements a network topology in a tree form, and nodes A to O are shown on the implemented network topology.

In this case, the first node A may be a sink node. The second node B and the third node C are connected to the first node A. The fourth node D and the fifth node E are connected to the second node B, and the sixth node F and the seventh node G are connected to the third node C. Furthermore, the eighth node H and the ninth node I are connected to the fourth node D, and the tenth node J and the eleventh node K are connected to the fifth node E. The twelfth node L and the thirteenth node M are connected to the sixth node F, and the fourteenth node N and the fifteenth node O are connected to the seventh node G.

In this case, based on the second node B, the parent node of the second node B is the first node A, i.e., a sink node, and the child nodes of the second node B are the fourth node D and the fifth node E.

Accordingly, the scheduling apparatus 100 implemented in the second node B may transmit data, including sensing information generated at the second node B itself and sensing information received from the fourth node D and the fifth node E (or the sensing information of the child nodes H, I, J and K of the fourth node D and the fifth node E) to the first node A. Furthermore, the scheduling apparatus 100 implemented in the second node B may receive data corresponding to the second node B from the first node A, or may receive data to be transmitted to the fourth node D and the fifth node E (including data to be transmitted to the child nodes H, I, J and K of the fourth node D and the fifth node E) and transmit the data to the corresponding nodes.

Furthermore, assuming that a rank is a hop count, the first node A is a reference node, and the hop count value (e.g., rank value) of the first node A is "0." The hop count values of the second node B and the third node C are "1." The hop count values of the fourth node D, the fifth node E, the sixth node F, and the seventh node G are "2." Furthermore, the hop count values of the eighth node H, the ninth node I, the tenth node J, the eleventh node K, the twelfth node L, the thirteenth node M, the fourteenth node N, and the fifteenth node O are "3."

Figure 3:
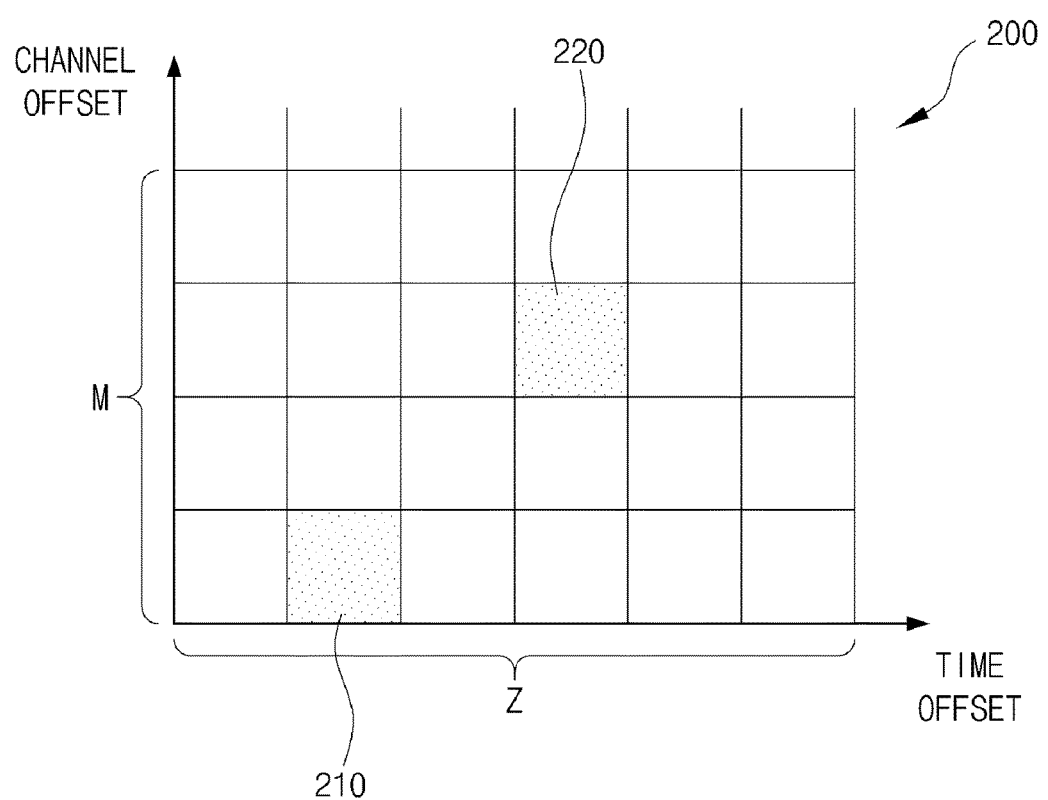
FIG. 3 is a diagram showing a slot frame according to an embodiment of the present invention.

FIG. 3 is a diagram showing a slot frame 200 according to an embodiment of the present invention.

As shown in FIG. 3, the slot frame 200 may be represented by channels and time. The vertical axis represents offset values for channels, and the lateral direction represents time offset values for time.

For example, the slot frame 200 is divided into four channel offsets and six time offsets. In this case, the slot frame 200 is illustrative, and may have a different number of channel offsets and a different number of time offsets. Furthermore, a time interval corresponding to a single time offset may have a value of about 10-20 msec. The time interval may be set to various different values based on the implementation of the apparatus or network.

Accordingly, the slot frame 200 may include cells each defined by a single channel offset and a single time offset, and may be composed of 24 (4 (M)*6 (Z)) cells. For example, as for the cells 210 and 220 of the slot frame 200, the first cell 210 may have a channel offset value of 0 and a time offset value of 1, and may be represented as (0, 1).

Furthermore, the second cell 220 may have a channel offset value of 2 and a time offset value of 3, and may be presented by (2, 3).

In the network topology configured according to the present invention, each of the nodes may transmit data at a scheduled transmission time by using the slot frame shown in FIG. 3.

Accordingly, the scheduling apparatus 100 proposed by the present invention may perform the scheduling operation of allocating cells for data transmission at each of the nodes. This enables the scheduling apparatus 100 to determine the time to transmit or receive data to and from a parent node and the time to transmit or receive data to and from a child node.

Figure 4:
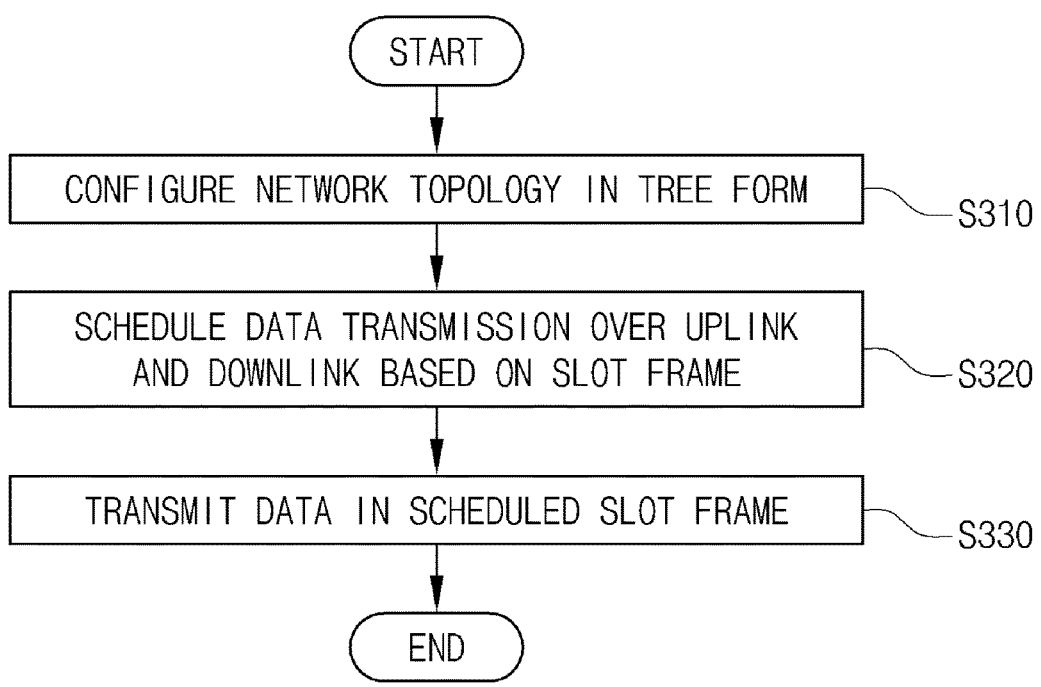
FIG. 4 is a flowchart showing a scheduling method according to an embodiment of the present invention.

FIG. 4 is a flowchart showing a scheduling method according to an embodiment of the present invention.

The scheduling method according to the embodiment shown in FIG. 4 includes steps that are processed in a time sequence by the scheduling apparatus 100 shown in FIG. 1. Accordingly, the descriptions that are omitted in the following but have been given in connection with the scheduling apparatus 100 shown in FIG. 1 may be applied to the scheduling method according to the embodiment shown in FIG. 4.

As shown in FIG. 4, at step S310, the scheduling apparatus 100 configures a network topology in a tree form. The network topology in a tree form may be generated based on a sink node. In the case where rank values are set based on hop counts in the network topology, assuming that the rank value of the sink node is 0, the rank values of nodes connected to the sink node by using the sink node as a parent node become 1, the rank values of nodes connected to a node having a rank value of 1 by using nodes having a rank value of 1 as parent nodes become 2, and the rank values of nodes connected to a node having a rank value of 2 by using nodes having a rank value of 2 as parent nodes become 3.

In the network topology in a tree form, a single node in which the scheduling apparatus 100 has been configured may be connected to a parent node and child nodes, and the scheduling apparatus 100 may transmit data only via the connected nodes.

The network topology in a tree form is shown in FIG. 2 as an example.

At step S320, the scheduling apparatus 100 schedules data transmission over an uplink and a downlink based on a slot frame. The scheduling apparatus 100 performs scheduling adapted to allocate the cells of the slot frame to a corresponding node for the purpose of transmitting and receiving data. In this case, the scheduling may be classified into uplink scheduling and downlink scheduling.

For example, the scheduling apparatus 100 may perform reception scheduling for an uplink by using Equation 1 below:

$$\text{TimeOffset} = (\text{NodeRank}\%2)*(Z/2) + \text{Hash}(\text{NodeID} + \text{ChildID} + \text{SlotframeID})\%(Z/2)$$

$$\text{ChannelOffset} = \text{Hash}(\text{ChildID} + \text{SlotframeID})\%M \quad (1)$$

In Equation 1, TimeOffset denotes a time offset, and ChannelOffset denotes a channel offset. NodeRank denotes the rank of a node, and NodeID denotes the ID of a node currently being scheduled. Furthermore, ChildID denotes the ID of a child node, and SlotframeID denotes the ID of a slot frame. Z denotes the length of a single slot frame or the value of all time offsets constituting the slot frame, and M denotes the number of channel offsets constituting the single slot frame or the value of all channel offsets constituting the slot frame. Furthermore, % denotes a modular operation, * denotes a multiplication operation, / denotes a division operation, and Hash ( ) denotes a hash function.

The scheduling apparatus 100 may schedule cells (determined based on the time offset and channel offset of Equation 1) based on the data reception over the uplink at the corresponding node via the reception scheduling for the uplink.

The scheduling apparatus 100 may perform transmission scheduling for an uplink by using Equation 2 below:

$$\text{TimeOffset} = (\text{ParentRank}\%2)*(Z/2) + \text{Hash}(\text{ParentID} + \text{NodeID} + \text{SlotframeID})\%(Z/2)$$

$$\text{ChannelOffset} = \text{Hash}(\text{NodeID} + \text{SlotframeID})\%M \quad (2)$$

In this case, ParentRank denotes the rank of a parent node, and ParentID denotes the ID of the parent node. For descriptions of the other IDs and symbols, see the descriptions of the IDs and symbols of Equation 1.

The scheduling apparatus 100 may schedule cells (determined based on the time offset and channel offset of Equation 2) based on data transmission over the uplink at the corresponding node via the transmission scheduling for the uplink.

The scheduling apparatus 100 may perform reception scheduling for a downlink by using Equation 3 below:

$$\text{TimeOffset} = (\text{ParentRank}\%2)*(Z/2) + \text{Hash}(\text{ParentID} + \text{SlotframeID})\%(Z/2)$$

$$\text{ChannelOffset} = \text{Hash}(\text{ParentID} + \text{SlotframeID})\%M \quad (3)$$

In this case, for descriptions of the IDs and symbols of Equation 3, see the descriptions of the IDs and symbols of Equations 1 and 2.

The scheduling apparatus 100 may schedule cells (determined based on the time offset and channel offset of Equation 3) based on data reception over the downlink at the corresponding node via the reception scheduling for the downlink.

The scheduling apparatus 100 may perform transmission scheduling for a downlink by using Equation 4 below:

$$\text{TimeOffset} = (\text{NodeRank}\%2)*(Z/2) + \text{Hash}(\text{NodeID} + \text{SlotframeID})\%(Z/2)$$

$$\text{ChannelOffset} = \text{Hash}(\text{NodeID} + \text{SlotframeID})\%M \quad (4)$$

In this case, for descriptions of the IDs and symbols of Equation 3, see the descriptions of the IDs and symbols of Equations 1 and 2.

The scheduling apparatus 100 may schedule cells (determined by the time offset and channel offset of Equation 4) based on data reception over the downlink at the corresponding node via the transmission scheduling for the downlink.

Thereafter, once a cell in which data will be transmitted, the scheduling apparatus 100 transmits data in the scheduled cell within the slot frame at step S330. In this case, the scheduling apparatus 100 may transmit uplink data by using an uplink slot frame, and may transmit downlink data by using a downlink slot frame.

Figure 5:
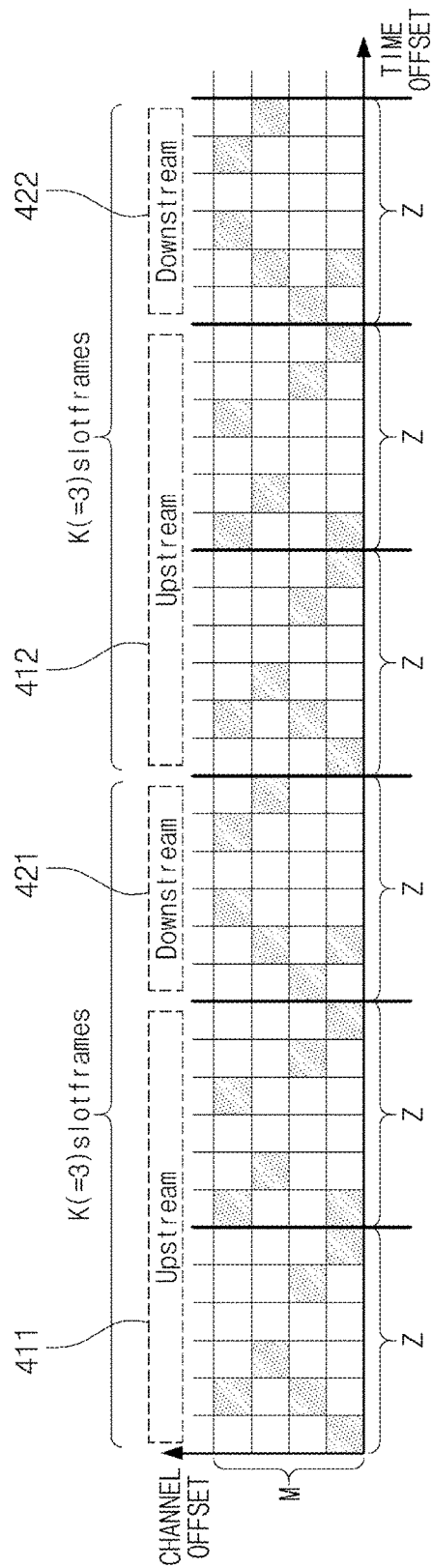
FIG. 5 is a diagram showing the allocation of slot frames based on uplink and downlink scheduling according to an embodiment of the present invention.

FIG. 5 is a diagram showing the allocation of slot frames based on uplink and downlink scheduling according to an embodiment of the present invention.

As shown in FIG. 5, a plurality of slot frames is shown. For example, uplink slot frames 411 and 412 and downlink slot frames 421 and 422 are shown.

For example, a case where the number of uplink slot frames 411 is "2" and the number of downlink slot frames 421 is "1," and thus the sum K of the slot frames is "3" is illustrated. For example, the scheduling apparatus 100 may use modular operation in order to obtain a downlink slot frame. In this case, the scheduling apparatus 100 may perform a modular operation (SlotframeID % K (=3)) with a current slot frame ID (SlotframeID) set to K. The scheduling apparatus 100 may determine that a slot frame for which the result of the modular operation is "0" is a downlink slot frame, and may determine that slot frames for which the result of the modular operation is not "0" are uplink slot frames.

As described above, the scheduling apparatus 100 may classify a plurality of slot frames into uplink and downlink slot frames and then perform transmission, and may perform scheduling operation in each of all slot frames. A cell to be scheduled in individual slot frames may be scheduled in different forms. For example, a cell scheduled for a specific node in a current slot frame may be scheduled for another node in a subsequent slot frame.

The scheduling apparatus 100 may allocate a number of uplink slot frames larger than the number of downlink slot frames. For example, the reason for this is that in a sensor network or the like, the amount of uplink data used to transmit sensing information from a general node to a sink node is larger than the amount of downlink data that is transmitted from the sink node to the general node. Accordingly, the numbers of uplink and downlink slot frames may be adjusted according to various methods based on the amount of data that is transmitted in the network topology.

Figure 6:
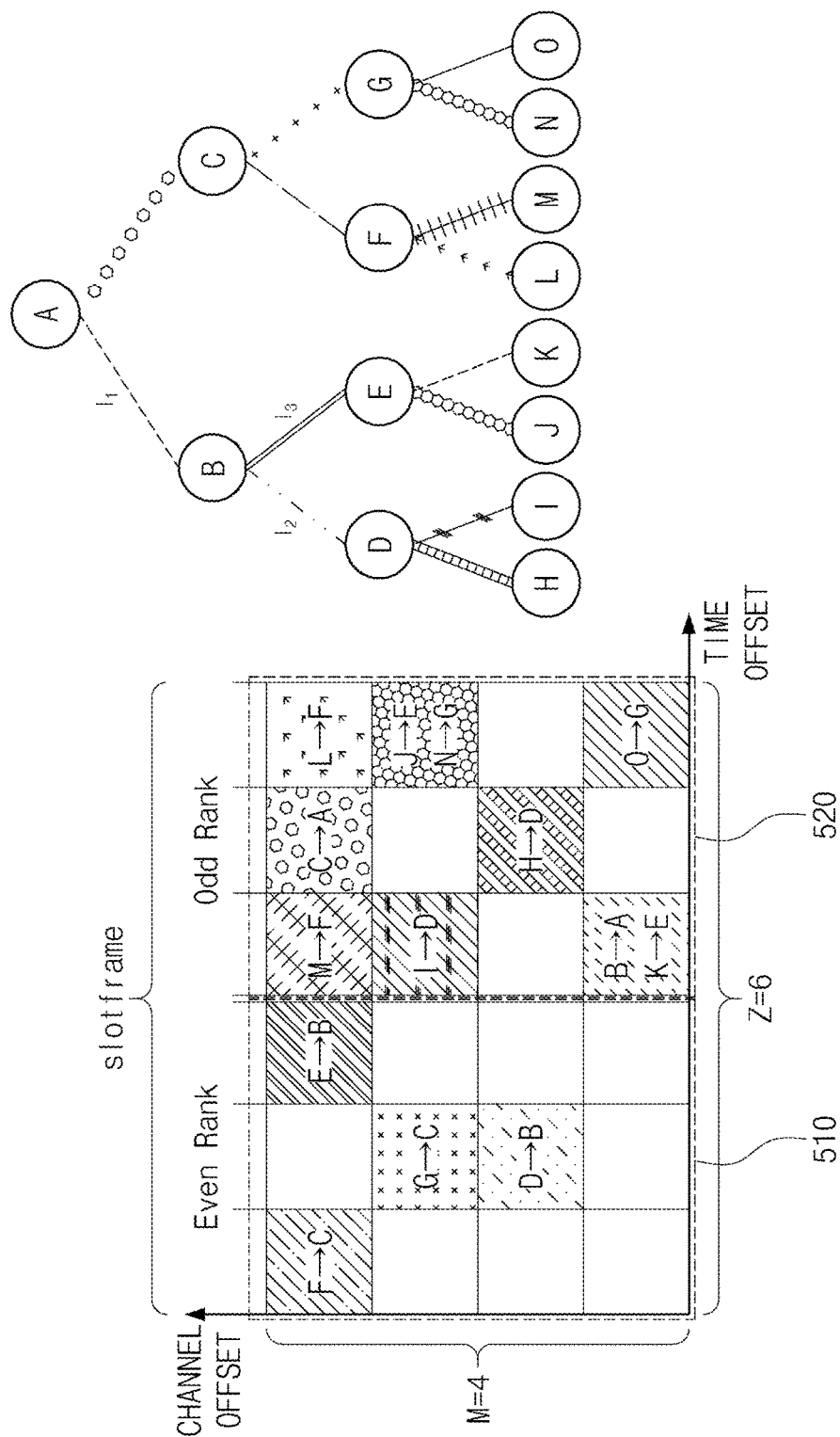
FIG. 6 is a diagram showing cells allocated to nodes through scheduling in a network topology according to an embodiment of the present invention.

FIG. 6 is a diagram showing cells allocated to nodes through scheduling in a network topology according to an embodiment of the present invention.

As shown in FIG. 6, in the network topology, individual nodes may form links. For example, a first region 510 and a second region 520 may be defined in a single slot frame. The scheduling apparatus 100 may allocate zeroth to second offsets to the first region 510, and may allocate third to fifth offsets to the second region 520 based on the time offsets.

In this case, based on a second node B, there are a first link $l_1$ formed in connection with a first node A, a second link $l_2$ formed in connection with a fourth node D, and a third link $l_3$ formed in connection with a fifth node E.

For example, in an uplink slot frame, data over links formed by ranks having even values (for example, the upstream data of the second link $l_2$ and the third link $l_3$) may be transmitted in the first region 510, and data over a link (for example, the upstream data of the first link $l_1$) formed by ranks having odd values (for example, the second node B) may be transmitted in the second region 520.

Accordingly, the scheduling apparatus 100 may transmit uplink data over the links 502 in the first region 510, and may transmit uplink data over the links 501 and 503 in the second region 520. As described above, the scheduling apparatus 100 classifies data transmission at different ranks and then performs transmission, thereby performing scheduling so that collisions attributable to data transmission can be minimized.

In this case, although the description has been given based on the uplink, slot frames may be scheduled in the case of data transmission over a downlink in a form similar to the form in the case of data transmission over an uplink.

Figure 7:
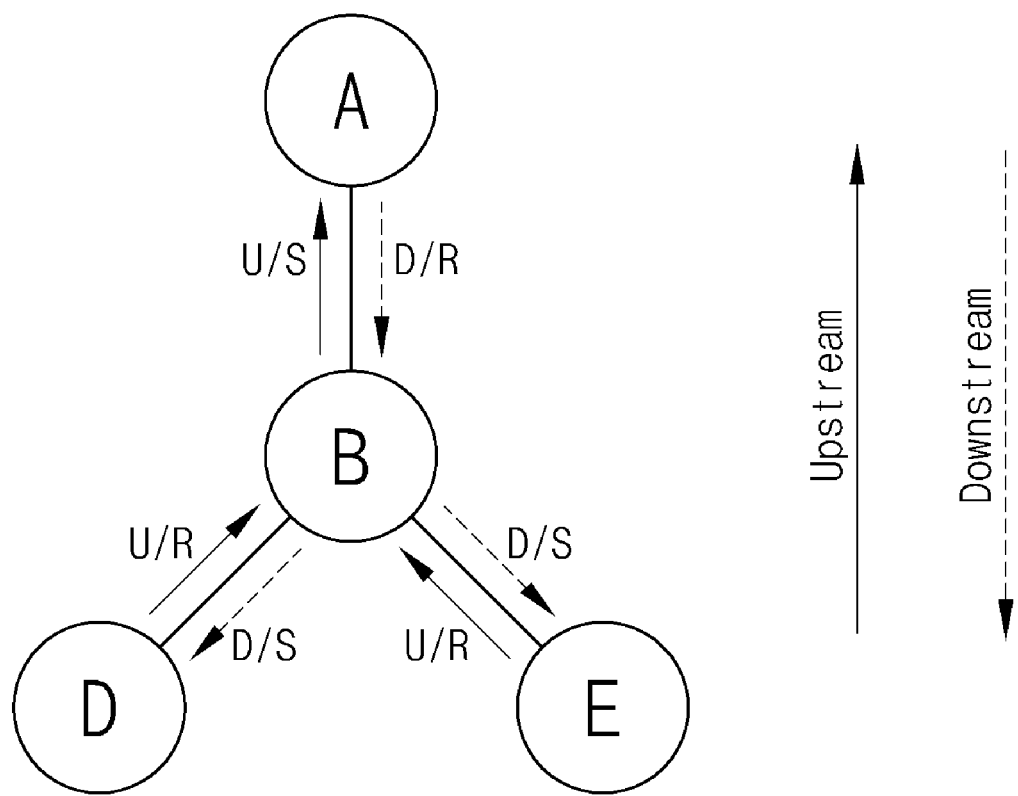
FIG. 7 is a diagram showing data flows based on uplink and downlink scheduling at the second node shown in FIG. 6.

FIG. 7 is a diagram showing data flows based on uplink and downlink scheduling at the second node shown in FIG. 6.

As shown in FIG. 7, based on a single second node B, a parent node A, and child nodes D and E are shown.

According to the RPL protocol, in a network topology, a node may generally have a single parent node, and may generally have at least one child node. Alternatively, a node does not have a child node.

In the drawing, "U" denotes uplink data, i.e., an upstream, and refers to data or a packet that is transmitted in a direction from a lower-level node (or a leaf node) to a first node A (i.e., a sink node). "D" denotes downlink data, i.e., a downstream, and refers to data or a packet transmitted in a direction from the sink node to lower-level nodes (or leaf nodes D and E). Furthermore, "S" denotes the transmission of data by a reference node B, and "R" denotes the reception of data by the reference node B.

Accordingly, the scheduling apparatus 100 of the reference node B may schedule the portion indicated by "U/R" by using the above-described Equation 1, and may schedule the portion indicated by "U/S" by using the above-described Equation 2. Furthermore, the scheduling apparatus 100 may schedule the portion indicated by "D/R" by using the above-described Equation 3, and may schedule the portion indicated by "D/S" by using the above-described Equation 4.

As described above, the scheduling apparatus 100 of each node may perform the cell scheduling of a subsequent slot frame by using the MAC addresses of the parent node and the child nodes before the period of a new slot frame starts. Thereafter, the scheduling apparatus 100 may operate in a wake-up or sleep mode based on the result of the scheduling of the slot frame, and may perform the scheduling of the new slot frame when the period of the new slot frame starts.

Figure 8:
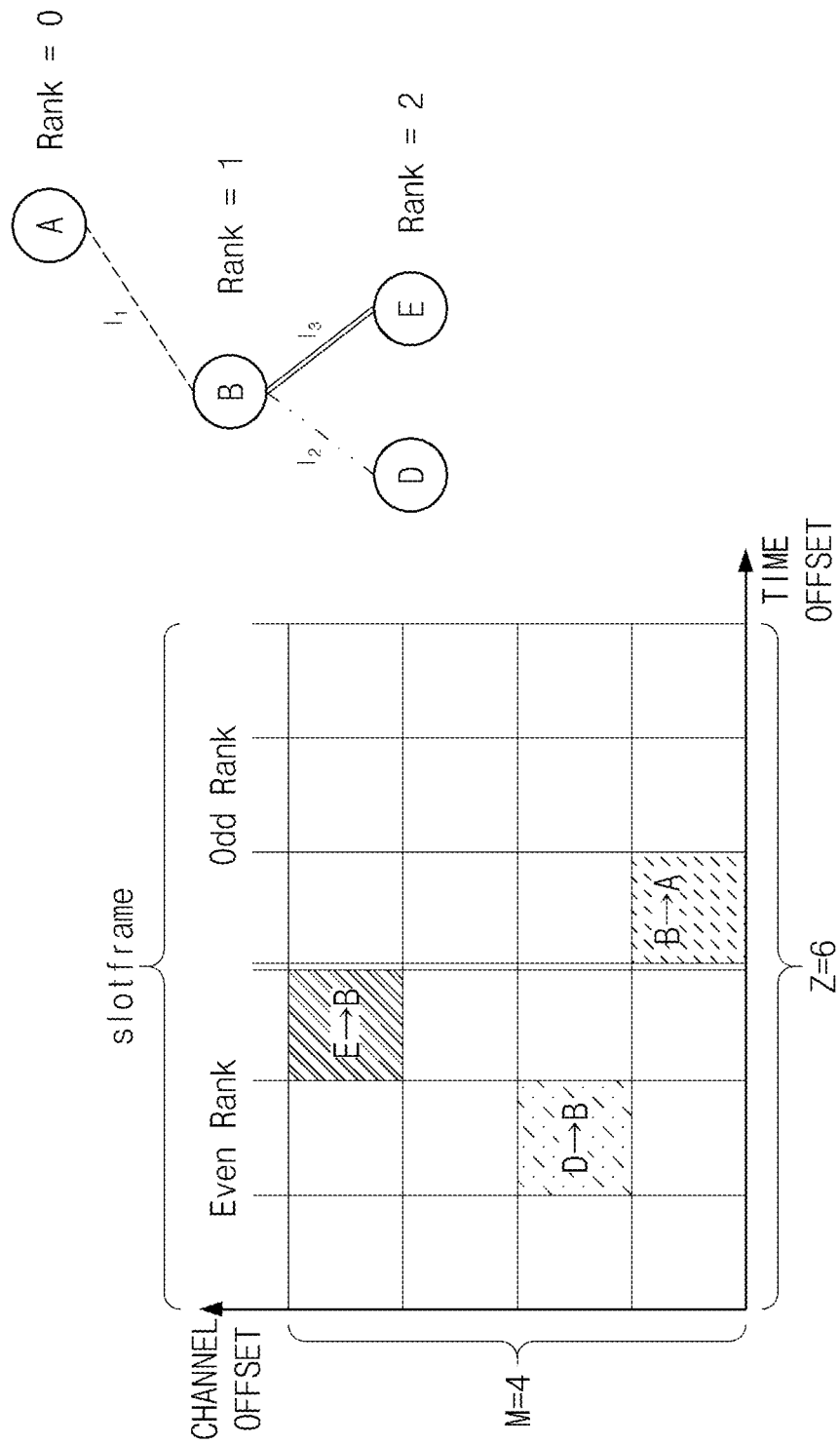
FIG. 8 is a diagram showing the allocation of cells within a slot frame based on uplink and downlink scheduling at a node according to an embodiment of the present invention.

FIG. 8 is a diagram showing the allocation of cells within a slot frame based on uplink and downlink scheduling at a node according to an embodiment of the present invention.

As shown in FIG. 8, a slot frame based on uplink scheduling at a second node B is shown. In this case, the rank of a first node A is "0," the rank of the second node B is "1," and the ranks of a fourth node D and a fifth node E are "2." As described above, a single node, for example, the second node B, is different in the rank value from the parent node A or child nodes D and E by 1. The parent node A has a rank value smaller than the second node B's own rank value by 1, and the child nodes D and E have a rank value smaller than the second node B's own rank value by 1.

As described above, since a slot frame is divided and scheduled based on rank values, the scheduling apparatus of the second node B receives data over a corresponding channel (but does not transmits data) in the time interval during which the second node B receives a message, i.e., the first region 510, and the scheduling apparatuses of the parent node A and the child nodes B and C receive data over the corresponding channel (but do not transmit data) in a time interval during which the second node B transmits a message, i.e., the second region 520. In this case, although the case where the slot frame is divided into two regions, i.e., the first region 510 and the second region 520, based on the time has been described as an example, the first region 510 and the second region 520 are defined based on various different criteria, or the slot frame is divided into two or more regions.

In this case, a node Node is the second node B, a parent Parent is the first node A, and children are third nodes D and E. Accordingly, the rank Rank of the second node B, i.e., a current node, has a rank value of 1. Furthermore, a node rank NodeRank has a value of 1, a parent rank ParentRank has a value of 0, and a child rank ChildRank has a value of 2.

Furthermore, the length Z of the slot frame Slotframe has a value of 6, and the number M of channel offsets has a value of 4.

Meanwhile, the scheduling apparatus 100 may obtain the ID of the current slot frame by using an ASN value. For example, when the ASN value is 93, the value of the slot frame ID SlotframeID starting from 0 is 15 obtained by dividing 93 by a slot frame length of 6 and then rounding down. In other words, when the ASN value is 93, the slot frame of a 16th slot frame period may be scheduled.

For example, the MAC address value of the second node B may be 2943 (NodeID), the MAC address value of the first node A may be 9483 (ParentID), the MAC address value of the fourth node D may be 1342 (ChildID), and the MAC address value of the fifth node E may be 6296 (ChildID).

In this case, when uplink reception scheduling is performed based on Equation 1, this may be represented by Equation 5 below:

$$TimeOffset=(0\%2)*(6/2)+Hash(2943+ChildID+93)\%(6/2)=0*3+Hash(ChildID+3\ 036)\%3$$

$$ChannelOffset=Hash(ChildID+93)\%4 \quad (5)$$

In this case, when 1342, i.e., the childID of the fourth node D, is applied, the scheduling apparatus 100 may obtain (2, 3) in which a time offset is 2 and a channel offset is 3. Furthermore, when 1342, i.e., the childID of the fourth node D, is applied, the scheduling apparatus 100 may obtain (2, 3) in which a time offset is 2 and a channel offset is 3.

Furthermore, when uplink transmission scheduling is performed based on Equation 2, this may be represented by Equation 6 below:

$$TimeOffset=(1\%2)*(6/2)+Hash(9483+2943+93)\%(6/2)=1*3+Hash(12519)\%3=3$$

$$ChannelOffset=Hash(2943+93)\%4=0 \quad (6)$$

As described above, the scheduling apparatus 100 may perform downlink reception scheduling, and thus may obtain a time offset of 3 and a channel offset of 0.

Accordingly, the scheduling apparatus 100 may schedule data from the child nodes D and E in cells (2, 3) and (1, 1), respectively, by performing transmission scheduling for the uplink, and may perform scheduling in a cell (3, 0) by performing transmission scheduling for the uplink.

This is illustrative. The scheduling apparatus 100 may allocate cells in the slot frame for reception and transmission scheduling for a downlink by using Equations 3 and 4, as in the case of using Equations 1 and 2 of FIG. 8.

The term "~ unit" used herein may refer to a software component, or a hardware component, such as, a field programmable gate array (FPGA) or an application specific integrated circuit (ASIC), and the "~ unit" performs at least one function or operation. However, the "~ unit" is not meant to be limited to the software or hardware. The "~ unit" may be configured to reside on an addressable storage medium and to run one or more processors. Therefore, as an example, the "~ unit" includes a component such as a software component, an object-oriented software component, a class component, or a task component, a process, a function, an attribute, a procedure, a subroutine, a segment of program code, a driver, firmware, microcode, circuitry, data, a database, a data structure, a table, an arrays, or a variable.

The function provided by the "~ unit" may be provided separately by one or more components, or may be incorporated with one or more functions.

Furthermore, the "~ unit" may be implemented to run one or more CPUs present in a device or security multimedia card.

Furthermore, the method according to an embodiment of the present invention may be implemented as a computer program (or a computer program product) including computer-executable instructions. The computer program includes programmable machine instructions that can be processed by a processor, and may be implemented as a high-level programming language, an object-oriented programming language, an assembly language, a machine language, or the like. Furthermore, the computer program may be stored on a computer-readable storage medium (for example, memory, a hard disk, a magnetic/optical medium, a solid-state drive (SSD), or the like).

The method according to an embodiment of the present invention may be implemented in such a way that the above-described computer program is executed by a computing device. The computing device may include at least some of a processor, memory, a storage device, a high-speed interface connected to the memory and a high-speed extension port, and a low-speed interface connected to a low-speed bus and the storage device. The above components are connected to each other via various buses, and may be mounted on a common mother board or by another appropriate method.

In this case, the processor may process instructions in the computing device. Such instructions may be instructions that are stored in memory or a storage device to display graphic information adapted to provide a Graphic User Interface (GUI) onto an external input/output device, e.g., a display connected to a high-speed interface. As another embodiment, a plurality of processors and or a plurality of buses may be used in conjunction with a plurality of pieces of memory or a plurality of memory forms. Furthermore, the processors may be implemented as a chipset composed of chips including a plurality of analog or digital independent processors.

Furthermore, the memory stores information inside the computing device. As an example, the memory may be composed of a volatile memory unit or a set of volatile memory units. As another example, the memory may be composed of a nonvolatile memory unit or a set of nonvolatile memory units. Furthermore, the memory may be another type of computer-readable medium, such as a magnetic or optical disk.

Furthermore, the storage device may provide a mass storage space to the computing device. The storage device may be a computer-readable medium or a configuration including a computer-readable medium. For example, the storage device may include devices inside a storage area network (SAN) or another configuration. The storage device may be a floppy disk device, a hard disk device, an optical disk device, a tape device, flash memory, another semiconductor memory device similar thereto, or another device array.

According to the above-described present invention, there may be proposed the scheduling apparatus and method that configure a network topology in a tree form and do not perform any negotiation between nodes within a network based on the characteristics of the structure.

Furthermore, according to the above-described present invention, there may be proposed the scheduling apparatus and method that perform link-based scheduling for an uplink and a downlink based on ranks in order to avoid collisions between uplink data and downlink data, thereby minimizing collisions attributable to data transmission between nodes in a network.

The above description of the present invention is illustrative. It will be apparent to those having ordinary knowledge in the art to which the present invention pertains that the above-described embodiments may be easily modified into other forms without departing from the technical spirit or essential features of the present invention. Therefore, it should be understood that the above-described embodiments are illustrative in all aspects and are not limitative. For example, each component described as being in a single form may be practiced in a distributed form. In the same manner, components described as being in a distributed form may be practiced in an integrated form.

The scope of the present invention is defined by the attached claims, rather than the above detailed description. Furthermore, all modifications and variations derived from the meanings, scope and equivalents of the claims should be construed as falling within the scope of the present invention.

What is claimed is:

1. A scheduling apparatus, comprising:
   a network topology configuration unit configured to configure a network topology that connects nodes to which rank values have been allocated based on a sink node; and
   a scheduling unit configured to schedule data transmission over an uplink and a downlink in a first region and a second region defined in each slot frame based on the rank values obtained based on the sink node;
   wherein the first region and the second region have different time offsets within the slot frame,
   wherein the scheduling unit transmits data in the first region when a rank value obtained based on the sink node is an even rank, and transmits data in the second region when a rank value obtained based on the sink node is an odd rank,
   wherein the scheduling unit comprises an uplink scheduler configured to schedule transmission and reception of uplink data, and a downlink scheduler configured to schedule transmission and reception of downlink data, and
   wherein the uplink scheduler performs the reception scheduling for the uplink by scheduling a time offset and a channel offset within the slot frame based on Equation below:

$$TimeOffset=(NodeRank\%2)*(Z/2)+Hash(NodeID+ChildID+SlotFrameID)\%(Z/2)$$

$$ChannelOffset=Hash(ChildID+SlotFrameID)\%M$$

where TimeOffset denotes a time offset, ChannelOffset denotes a channel offset, NodeRank denotes the rank of a node, NodeID denotes the ID of a node currently being scheduled, ChilID denotes the ID of a child node, SlotframeID denotes the ID of a slot frame, Z denotes the length of a single slot frame or the value of all time offsets constituting the slot frame, and M denotes the number of channel offsets constituting the single slot frame or the value of all channel offsets constituting the slot frame,
   where % denotes a modular operation, * denotes a multiplication operation, / denotes a division operation, and Hash ( ) denotes a hash function.

2. The scheduling apparatus of claim 1, wherein the network topology configuration unit configures a network topology in a tree form by connecting nodes, having received respective beacon signals transmitted by the sink node at intervals of a predetermined period, to a time slot channel scheduling network formed by the sink node.

3. The scheduling apparatus of claim 2, wherein the network topology configuration unit configures the network topology in a tree form by using an IPv6 routing protocol for low-power lossy networks (RPL) protocol in a network layer and a time slot channel scheduling-based 802.15.4e protocol in a link layer.

4. The scheduling apparatus of claim 1, wherein the scheduling unit generates a number of slot frames for the uplink and a number of slot frames for the downlink at a preset ratio, and sets the number of slot frames for the uplink to a value larger than the number of slot frames for the downlink.

5. The scheduling apparatus of claim 1, wherein the uplink scheduler performs the transmission scheduling for the uplink by scheduling a time offset and a channel offset within the slot frame based on Equation below:

$$TimeOffset=(ParentRank\%2)*(Z/2)+Hash(ParentID+NodeID+SlotFrameID)\%(Z/2)$$

$$ChannelOffset=Hash(NodeID+SlotFrameID)\%M$$

where TimeOffset denotes a time offset, ChannelOffset denotes a channel offset, ParentRank denotes the rank of a parent node, ParentID denotes the ID of a parent node, NodeID denotes the ID of a node currently being scheduled, SlotframeID denotes the ID of a slot frame, Z denotes the length of a single slot frame or the value of all time offsets constituting the slot frame, and M denotes the number of channel offsets constituting the single slot frame or the value of all channel offsets constituting the slot frame,
where % denotes a modular operation, * denotes a multiplication operation, / denotes a division operation, and Hash ( ) denotes a hash function.

6. The scheduling apparatus of claim 1, wherein the downlink scheduler performs the reception scheduling for the downlink by scheduling a time offset and a channel offset within the slot frame based on Equation below:

$$TimeOffset=(ParentRank\%2)*(Z/2)+Hash(ParentID+SlotFrameID)\%(Z/2)$$

$$ChannelOffset=Hash(ParentID+SlotFrameID)\%M$$

where TimeOffset denotes a time offset, ChannelOffset denotes a channel offset, ParentRank denotes the rank of a parent node, ParentID denotes the ID of a parent node, SlotframeID denotes the ID of a slot frame, Z denotes the length of a single slot frame or the value of all time offsets constituting the slot frame, and M denotes the number of channel offsets constituting the single slot frame or the value of all channel offsets constituting the slot frame,
where % denotes a modular operation, * denotes a multiplication operation, / denotes a division operation, and Hash ( ) denotes a hash function.

7. The scheduling apparatus of claim 1, wherein the downlink scheduler performs the transmission scheduling for the downlink by scheduling a time offset and a channel offset within the slot frame based on Equation below:

$$TimeOffset=(NodeRank\%2)*(Z/2)+Hash(NodeID+SlotFrameID)\%(Z/2)$$

$$ChannelOffset=Hash(NodeID+SlotFrameID)\%M$$

where TimeOffset denotes a time offset, ChannelOffset denotes a channel offset, NodeRank denotes the rank of a node currently being scheduled, NodeID denotes the ID of a node, SlotframeID denotes the ID of a slot frame, Z denotes the length of a single slot frame or the value of all time offsets constituting the slot frame, and M denotes the number of channel offsets constituting the single slot frame or the value of all channel offsets constituting the slot frame, where % denotes a modular operation, * denotes a multiplication operation, / denotes a division operation, and Hash ( ) denotes a hash function.

8. A scheduling method for a scheduling apparatus, the scheduling method comprising:

configuring a network topology that connects nodes to which rank values have been allocated based on a sink node; and scheduling data transmission over an uplink and a downlink in a first region and a second region defined in each slot frame based on the rank values obtained based on the sink node;

wherein the first region and the second region have different time offsets within the slot frame, wherein scheduling the data transmission over the uplink and the downlink comprises performing scheduling in such a way as to transmit data in the first region when a rank value obtained based on the sink node is an even rank and to transmit data in the second region when a rank value obtained based on the sink node is an odd rank, and wherein scheduling the data transmission over the uplink and the downlink further comprises performing the reception scheduling for the uplink by scheduling a time offset and a channel offset within the slot frame based on Equation below:

TimeOffset=(NodeRank%2)*(Z/2)+Hash(NodeID+ChildID+SlotFrameID)%(Z/2)

ChannelOffset=Hash(ChildID+SlotFrameID)%M where TimeOffset denotes a time offset, ChannelOffset denotes a channel offset, NodeRank denotes the rank of a node, NodeID denotes the ID of a node currently being scheduled, ChiIID denotes the ID of a child node, SlotframeID denotes the ID of a slot frame, Z denotes the length of a single slot frame or the value of all time offsets constituting the slot frame, and M denotes the number of channel offsets constituting the single slot frame or the value of all channel offsets constituting the slot frame, where % denotes a modular operation, * denotes a multiplication operation, / denotes a division operation, and Hash ( ) denotes a hash function.

9. The scheduling method of claim 8, wherein configuring the network topology comprises configuring a network topology in a tree form by connecting nodes, having received respective beacon signals transmitted by the sink node at intervals of a predetermined period, to a time slot channel scheduling network formed by the sink node.

10. The scheduling method of claim 9, wherein configuring the network topology comprises configuring the network topology in a tree form by using an IPv6 routing protocol for low-power lossy network (RPL) protocol in a network layer and a time slot channel scheduling-based 802.15.4e protocol in a link layer.

11. The scheduling method of claim 8, wherein scheduling the data transmission over the uplink and the downlink further comprises generating a number of slot frames for the uplink and a number of slot frames for the downlink at a preset ratio, and setting the number of slot frames for the uplink to a value larger than the number of slot frames for the downlink.

12. The scheduling method of claim 8, wherein scheduling the data transmission over the uplink and the downlink further comprises performing the transmission scheduling for the uplink by scheduling a time offset and a channel offset within the slot frame based on Equation below:

TimeOffset=(ParentRank%2)*(Z/2)+Hash(ParentID+NodeID+SlotFrameID)%(Z/2)

ChannelOffset=Hash(NodeID+SlotFrameID)%M where TimeOffset denotes a time offset, ChannelOffset denotes a channel offset, ParentRank denotes the rank of a parent node, ParentID denotes the ID of a parent node, NodeID denotes the ID of a node currently being scheduled, SlotframeID denotes the ID of a slot frame, Z denotes the length of a single slot frame or the value of all time offsets constituting the slot frame, and M denotes the number of channel offsets constituting the single slot frame or the value of all channel offsets constituting the slot frame, where % denotes a modular operation, * denotes a multiplication operation, / denotes a division operation, and Hash ( ) denotes a hash function.

13. The scheduling method of claim 8, wherein scheduling the data transmission over the uplink and the downlink further comprises performing the reception scheduling for the downlink by scheduling a time offset and a channel offset within the slot frame based on Equation below:

TimeOffset=(ParentRank%2)*(Z/2)+Hash(ParentID+SlotFrameID)%(Z/2)

ChannelOffset=Hash(ParentID+SlotFrameID)%M where TimeOffset denotes a time offset, ChannelOffset denotes a channel offset, ParentRank denotes the rank of a parent node, ParentID denotes the ID of a parent node, SlotframeID denotes the ID of a slot frame, Z denotes the length of a single slot frame or the value of all time offsets constituting the slot frame, and M denotes the number of channel offsets constituting the single slot frame or the value of all channel offsets constituting the slot frame, where % denotes a modular operation, * denotes a multiplication operation, / denotes a division operation, and Hash ( ) denotes a hash function.

14. The scheduling method of claim 8, wherein scheduling the data transmission over the uplink and the downlink further comprises performing the transmission scheduling for the downlink by scheduling a time offset and a channel offset within the slot frame based on Equation below:

TimeOffset=(NodeRank%2)*(Z/2)+Hash(NodeID+SlotFrameID)%(Z/2)

ChannelOffset=Hash(NodeID+SlotFrameID)%M where TimeOffset denotes a time offset, ChannelOffset denotes a channel offset, NodeRank denotes the rank of a node currently being scheduled, NodeID denotes the ID of a node, SlotframeID denotes the ID of a slot frame, Z denotes the length of a single slot frame or the value of all time offsets constituting the slot frame, and M denotes the number of channel offsets constituting the single slot frame or the value of all channel offsets constituting the slot frame, where % denotes a modular operation, * denotes a multiplication operation, / denotes a division operation, and Hash ( ) denotes a hash function.

* * * * *